(12) United States Patent
Circenis et al.

(10) Patent No.: US 7,373,497 B2
(45) Date of Patent: *May 13, 2008

(54) METHODS AND APPARATUS FOR RAPIDLY ACTIVATING PREVIOUSLY INACTIVE COMPONENTS IN A COMPUTER SYSTEM

(75) Inventors: Edgar I. Circenis, Loveland, CO (US); Bradley A. Klein, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/351,128

(22) Filed: Jan. 23, 2003

(65) Prior Publication Data

US 2004/0148394 A1    Jul. 29, 2004

(51) Int. Cl.
*G06F 9/00* (2006.01)
*G06F 15/177* (2006.01)
(52) U.S. Cl. .......................................... 713/100; 713/1
(58) Field of Classification Search ................ 713/1, 713/100
See application file for complete search history.

(56) References Cited

U.S. PATENT DOCUMENTS

| | | | |
|---|---|---|---|
| 5,717,604 A | 2/1998 | Wiggins | |
| 5,815,807 A | 9/1998 | Osmani et al. | |
| 6,195,750 B1 * | 2/2001 | Ellsworth | 713/100 |
| 6,366,950 B1 * | 4/2002 | Scheussler et al. | 709/206 |
| 6,453,344 B1 * | 9/2002 | Ellsworth et al. | 709/220 |
| 6,499,035 B1 | 12/2002 | Sobeski | |
| 2001/0011253 A1 * | 8/2001 | Coley et al. | 705/59 |
| 2002/0161990 A1 | 10/2002 | Zhang et al. | |
| 2003/0088516 A1 * | 5/2003 | Remer et al. | 705/59 |
| 2003/0135580 A1 * | 7/2003 | Camble et al. | 709/216 |
| 2004/0010581 A1 * | 1/2004 | Dodapati et al. | 709/224 |
| 2004/0148229 A1 * | 7/2004 | Maxwell | 705/26 |

FOREIGN PATENT DOCUMENTS

GB    2391975 A    2/2004

OTHER PUBLICATIONS

HP QuickSpecs, "HP Instant Capacity on Demand (iCOD) Solutions", http://h18002.www1.hp.com/products/quickspecs/11723_div/11723_div.HTML, May 24, 2004.
Search Report, Patent Office, UK, mailed May 27, 2004, 4 pp.

(Continued)

*Primary Examiner*—Chun Cao

(57) ABSTRACT

A method of activating a previously inactive component in a computer system is disclosed. The method includes receiving a request for activating the previously inactive component and ascertaining whether there exists a first right for activating the previously inactive component. The method further includes activating the previously inactive component in accordance with the first right if the first right exists. The method additionally includes ascertaining, if there is no first right for activating the previously inactive component, whether there exists a second right for activating the previously inactive component, the second right being more restricted than the first right. Furthermore, the method includes activating the previously active component in accordance with the second right if the second right exists.

26 Claims, 4 Drawing Sheets

OTHER PUBLICATIONS

Office Action of U.S. Appl. No. 10/350,660 dated Mar. 8, 2006.
Hewlett-Packard, "HP introduces instant capacity on demand solutions offering Australian E-services customers immediate additional server capacity" Nov. 16, 1999, pp. 1-3.

U.S. Appl. No. 10/350,660; filed on Jan. 23, 2003; Inventors; Circenis et al.

* cited by examiner

METHODS AND APPARATUS FOR RAPIDLY ACTIVATING PREVIOUSLY INACTIVE COMPONENTS IN A COMPUTER SYSTEM

This patent application relates to a commonly assigned patent application entitled "Methods And Apparatus For Managing Temporary Capacity In A Computer System," by inventors Edgar I. Circenis and Bradley A. Klein, (application Ser. No. 10/350,660, filed Jan. 23, 2001), and a commonly assigned patent application entitled "Methods And Apparatus For Managing The Execution Of A Task Among A Plurality Of Autonomous Processes," by inventors Edgar I. Circenis and Bradley A. Klein, (application Ser. No. 10/351,071, filed Jan. 23, 2001), all of which are filed on even date herewith and incorporated herein by reference.

BACKGROUND OF THE INVENTION

Nowadays, many computer systems are shipped to customers with inactive components provisioned therein. As the term is employed herein, an inactive component is a software or hardware component that the user has not paid for and is not entitled to use as a matter of right. Vendors include inactive components in a computer system for many reasons. For example, a vendor may anticipate that a particular user may need additional software and/or hardware capability in the future and may wish to include the additional capability in an inactive form so that the additional capability can be quickly enabled at a later date if needed.

ICOD (Instant Capacity On Demand) systems are computer systems that typically include one or more inactive components (known as ICOD components) when shipped to the user. The ICOD components may be processors, additional memory, additional cells, or the like. These ICOD components are inactive during normal use and can be activated when the user wishes to obtain additional capability from the ICOD system.

Generally speaking, when an ICOD system is shipped to a user, either the vendor or the customer will deactivate the inactive components so that only the components that have been paid for will be active during use. This deactivation may happen one time prior to shipping, or the ICOD system may include software to automatically deactivate the inactive components upon system booting based on licensing data stored in the ICOD system itself.

Vendors of ICOD systems are generally concerned with two issues: compliance and responsiveness to legitimate activation requests. Vendors are interested in ensuring that ICOD systems stay in compliance because if a user can utilize the additional capability without paying, there is no incentive to purchase the additional capability. Vendors are also interested in being responsive to legitimate activation requests of inactive components since such responsiveness improves customer service and facilitates the sale and/or license of components, which increases revenue to the vendor.

Some vendors rely on the user's honesty, preferring to depend on the user to voluntarily pay for the use of the inactive components when the user activates additional components in the ICOD system. Under the honor system, many users do indeed voluntarily report and pay when an inactive component is activated in order to legitimately acquire the use of the additional components. Other users, however, either through ignorance or by willful action, simply disregard the obligation to pay when activating a previously inactive component.

To ensure compliance, vendors in the past employ an inventory agent, e.g., codes in the ICOD system, to periodically take inventory of the inactive components and compare the number of inactive components with the licensing data stored in non-volatile memory. The data regarding the number of inactive components, along with other identification information such as the serial number of the computer system, the host name, the IP address, and the like may then be sent in an email to the vendor to allow the vendor to audit for compliance.

If a user's system is found to be in a non-compliant state, the vendor may undertake any number of corrective actions. For example, the vendor may wish to send a sales representative to the user whose system is found to be in a non-compliant state in order to suggest the licensing of the activated components. As another example, the vendor may notify the user of the non-compliant status and request that the buyer either immediately pay for the use of the inactive components, or to cease the non-compliant use.

However, it has been found that many users are reluctant to endow their production computer systems with an email infrastructure, and to risk exposing the computer system to the security risks that accompany email access. For some users, even the exposure of the host name to the outside world is unacceptable. For these users, the vendor has no recourse but to rely on the honesty of the user and perhaps costly surprise personal audits in order to ensure that their ICOD system stays in compliance.

Some vendors specify that an additional component may be turned on only after the user has paid for the additional component and obtains a specific codeword from the vendor to activate the additional component. While this method is highly secure, many users find it unacceptable to suffer through the delay of working their way through the bureaucracy at the user's organization to obtain authorization for the purchase and at the vendor's organization to obtain the codeword before the inactive components can be activated. In many cases, unforeseen circumstances may require the user to rapidly turn on certain inactive components to meet a sudden demand. If the vendor cannot offer the user the capability to rapidly activate inactive components, that vendor will be at a competitive disadvantage, especially if other vendors are willing to offer such rapid activation capability to the user.

SUMMARY OF THE INVENTION

The invention relates, in one embodiment, to a method of activating a previously inactive component in a computer system. The method includes receiving a request for activating the previously inactive component and ascertaining whether there exists a first right for activating the previously inactive component. The method further includes activating the previously inactive component in accordance with the first right if the first right exists. The method additionally includes ascertaining, if there is no first right for activating the previously inactive component, whether there exists a second right for activating the previously inactive component, the second right being more restricted than the first right. Furthermore, the method includes activating the previously active component in accordance with the second right if the second right exists.

In another embodiment, the invention relates to a method for allowing a user to activate a previously inactive component in a computer system, the computer including components already activated under an acquired right. The method includes sending a request for activating the previously inactive component to a vendor of the computer system. The method further includes obtaining a codeword from the vendor, the codeword implementing a pending right to activate the previously inactive component and including an authorization for activating the previously inactive component and a time parameter. The method additionally includes entering the codeword into the computer system, thereby allowing the additional component to be activated in the computer system during a time period allowed under the pending right, the time period being derivable from the time parameter.

In another embodiment, the invention relates to an article of manufacture comprising a program storage medium having computer readable codes embodied therein, the computer readable codes being configured for activating a previously inactive component in a computer system. The article of manufacture includes computer readable codes for receiving a request for activating the previously inactive component. The article of manufacture further includes computer readable codes for ascertaining whether there exists a first right for activating the previously inactive component. The article of manufacture additionally includes computer readable codes for activating, if the first right exists, the previously inactive component in accordance with the first right. The article of manufacture also includes computer readable codes for ascertaining, if there is no first right for activating the previously inactive component, whether there exists a second right for activating the previously inactive component, the second right being more restricted than the first right. The article of manufacture further includes computer readable codes for activating, if the second right exists, the previously active component in accordance with the second right.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
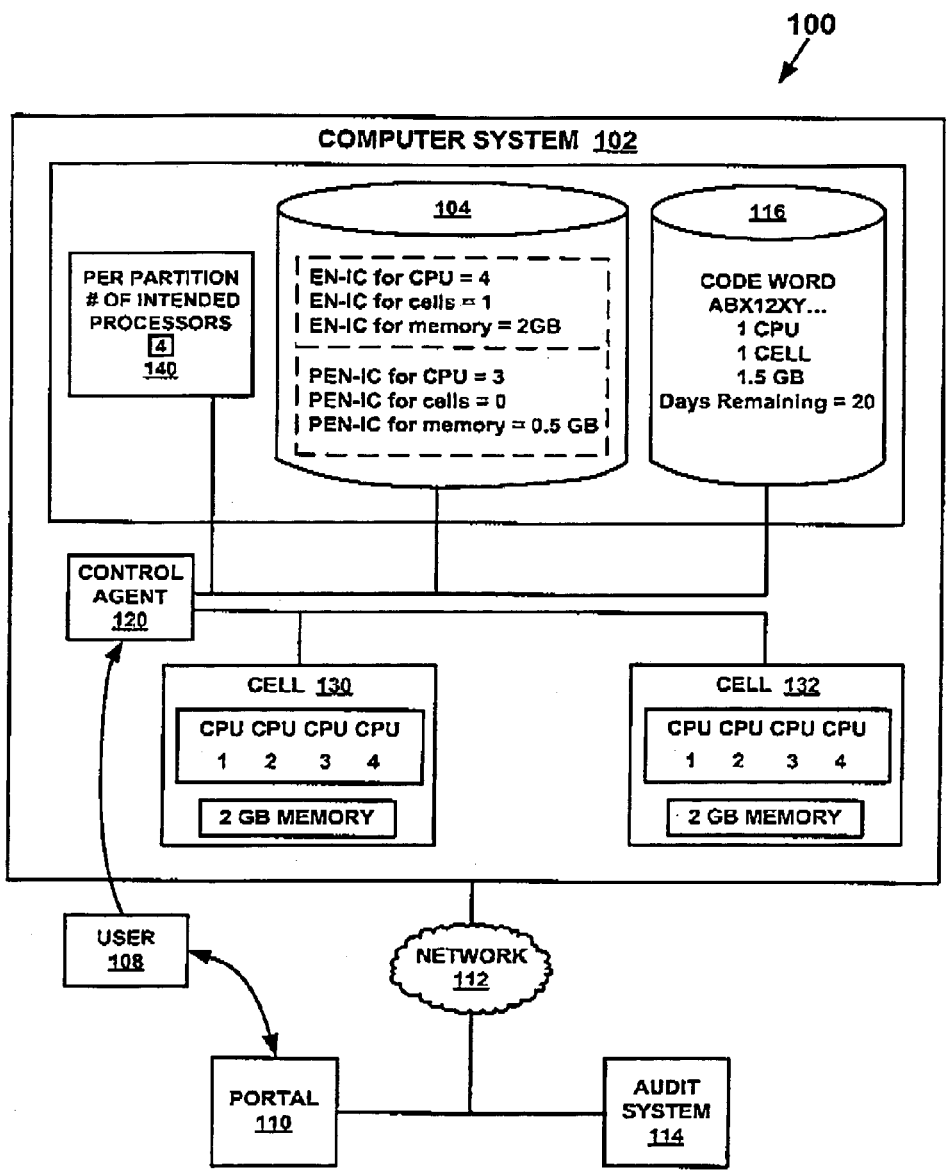
FIG. 1 shows, in accordance with one embodiment of the present invention, an arrangement for facilitating the rapid activation of previously inactive components in a computer system.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a system and method for allowing users to apply for and rapidly receive provisional computing capacity from inactive components in a computer system. Unlike the prior art honor approach, however, there are provided mechanisms to ensure that the computer system vendor is aware of the intent to activate previously inactive components and to encourage the user to make timely arrangement to pay for the provisionally granted additional capacity or risk losing the ability to employ the additional capacity once the provisional usage period expires. Furthermore, the inventive system and method herein do not require the implementation of an email facility or an Internet connection on the computer system in which the capacity increase is desired.

In one embodiment, the user's right to a computer system's computing capacity is tracked using two parameters: an acquired right parameter and a pending right parameter. The acquired right parameter tracks the computing capacity (such as the number of processors, the amount of memory, or any other component or subsystem) that the user has already paid for and/or is entitled to based on a previous arrangement. The pending right parameter tracks the provisional computing capacity that is provisionally granted to the user upon request. The provisional computing capacity is set to expire at the end of the provisional usage period unless the user makes arrangement to acquire additional capacity under an acquired right basis.

The user can request the provisional computing capacity by contacting the vendor using, for example the vendor's website, the telephone or by any other telecommunication or communication means to furnish his identification information, the computer system identification information, and the amount of provisional capacity desired in order to receive a codeword. Note that the term "vendor" is employed generically to denote the entity responsible for supporting the user and is not necessarily limited to (although the term may include) the manufacturer of the computer system, the distributor, the dealer, the contract servicing organization, or any other entity responsible for ensuring that the user obtain additional capacity if needed. The user can then apply the codeword to the computer system (by entering the codeword into the computer system, for example) to gain the ability to rapidly activate any previously inactive components that are covered by the pending right granted using the codeword. The user can choose to activate the inactive components immediately or activation may be deferred until system reboot, for example.

Consider a computer system with five CPUs, for example. The user may be entitled to, for example, three CPUs based on the acquired right acquired via a prior purchase or a paid-for license. If an urgent need for additional computing capacity arises, and the user wishes to rapidly activate one additional CPU, the user may request the pending right to the additional CPU by contacting the vendor website with the request and receive from the website a codeword that encapsulates, for example, the system identification information, the number of additional CPUs the user wishes to activate (1 in this case), as well as any conditions associated with the pending right. One condition may, for example, restrict the pending right duration to one month, during which time the user must either pay for the additional CPU (thereby converting the pending right to the additional CPU to an acquired right) or risk losing the use of the additional CPU at the expiration of the pending right period.

Once the codeword is received, the user may then apply the codeword to the computer system to enable the computer system to update the user's pending right parameter. After the codeword is applied to the computer system, the user can then activate the additional CPU. In some systems, activation may take place upon system reboot. In other systems, activation may be immediate. In either case, the computer system checks the user's acquired right parameter and allows activation of up to as many CPUs as authorized by the acquired right (3 in this case). The computer also checks the user's pending right parameter and allows activation of up to as many CPUs authorized by the pending right (1 in this example). After activation of a previously inactive CPU under the pending right parameter, 4 CPUs will be running on the computer system to handle the increased demand.

The user's ability to employ the additional CPU under the pending right continues until the pending right expires. During the pending right period and/or upon the expiration thereof, reminders may be issued by the computer system to alert the user of the expiration date and the need to acquire the additional CPU under an acquired right basis (by paying for the additional CPU, for example). If the user pays for the additional CPU before the expiration of the pending right period, there is preferably no interruption to the use of the additional CPU, which may be quite advantageous to the user. Even if the pending right duration expires, a grace period may be granted to the user upon expiration in some cases to allow the user additional time to contact the vendor and arrange for payment.

In a preferred embodiment, the acquired right parameter is mathematically represented by an expected number of inactive components (EN-IC) variable and the pending right parameter is mathematically represented using a pending expected number of inactive component (PEN-IC) variable. Each EN-IC variable tracks the number of inactive component of a given type (such as processors, memory, disk drives, and the like) that a computer system should have to be in compliance with the acquired right. In contrast, the PEN-IC variable tracks the number of inactive components that a computer system should have to comply with both the acquired right and the pending right. If there is no provisional capacity grant outstanding, the EN-IC value and PEN-IC value equal to one another in the computer system.

In the previous exemplary computer system having five CPUs, of which 3 CPUs are covered by an acquired right, the value of the EN-IC variable is 2 (5 minus 3). If the user requests one additional CPU on a provisional basis, receives a codeword therefore, and applies that codeword to the computer system, the PEN-IC value is 1 (5 minus 3 minus 1).

At activation time, the computer system checks to see whether the number of inactive components of that type (CPU in the present example) that would result from the activation request is greater than or equal to the EN-IC value for CPUs. If it is, the system is in compliance with the acquired right, and the requested activation of the CPUs is allowed. If the number of inactive CPUs that would result from the activation request is less than the EN-IC value, however, the system is in an exception state since there are fewer inactive CPUs than expected under the acquired right. Technically speaking, the computer system is out of compliance under the terms of the acquired right.

In this case, a further check is made against the PEN-IC value to ascertain whether this is a pending right grant outstanding. Assuming that there is a pending right grant outstanding and the pending right period has not expired, the PEN-IC value is lower than the EN-IC value. If the number of inactive CPUs that would result from the activation request is greater than or equal to the PEN-IC value, the system is in compliance due to the outstanding the pending right. In this case, the requested activation of the CPUs is allowed as well. However, if the number of inactive CPUs that would result from the request is less than the PEN-IC value, the system is in violation and activation of the requested number of components is denied.

At the expiration of the pending right period, the PEN-IC value is incremented by a value representative of the number of components covered by the pending right grant in order to disallow further use of the provisional capacity after expiration. As mentioned earlier, a grace period may be granted upon expiration to allow the user time to arrange for payment to convert the pending right to an acquired right. If the acquired right to the provisional capacity is purchased, the EN-IC value is decremented by a value representative of the number of components covered by the additional acquired right purchased. Thus, if the EN-IC value for a given component type reaches zero, there is no more inactive component of that component type in the computer system, and no more provisional grant for additional capacity of that type is possible. At that point, the vendor may be alerted to install additional inactive components, for example.

Compared to the prior art, there is no need for the computer system to have an email infrastructure and/or the ability to send and receive emails in order to allow the user to rapidly activate the inactive components therein. This is highly advantageous for production computer systems which, as mentioned earlier, are usually insulated from emails and internet connectivity for security reasons.

Furthermore, the additional capacity can be acquired rapidly, in most cases before an arrangement for payment is initiated. This ability allows the user to rapidly add provisional capacity any time, even late at night or in the middle of a busy holiday season. This is important for users such as e-commerce website operators who may, at times, face an emergency need for additional capacity and may not have the opportunity or the time at that point to work with his own purchasing department and/or the vendor to acquire the additional capacity through the traditional purchasing channel and the traditional purchasing time cycle.

Furthermore, there is a high level of accountability. The pending right is only granted for a short period of time, after which the user must arrange for payment to convert the pending right to an acquired right or risk losing the use of the additional capacity granted under the pending right. The vendor is aware (through the request and subsequent grant of the codeword) of the user's need for additional capacity and can follow up with sales calls to encourage the user to purchase the acquired right to the additional components. The vendor can also track the number of codewords issued to a given user, and if the user attempts to exploit the pending right feature by repeatedly requesting provisional capacity to use the additional computing power but unwilling to pay for the additional capacity in the form of an acquired right, the vendor can refuse to grant a codeword the next time that user makes such a request.

These and other features and advantages of the present invention may be better understood with reference to the drawings and figures that follow. FIG. 1 shows, in accordance with one embodiment of the present invention, an arrangement 100 for facilitating the rapid activation of previously inactive components in a computer system. As the term is employed herein, a computer system may represent a stand-alone computer, such as a mainframe system, a server or a workstation. The computer system may also represent a networked computer comprising a plurality of CPUs, memory modules, I/O devices coupled in a network. The computer system may be unpartitioned or it may be partitioned into multiple partitions.

The active and inactive components of the computer system may represent software components and/or hardware components. Any software or hardware component or group of components that can be selectively activated and/or deactivated can benefit from the rapid activation techniques disclosed herein.

There is shown in FIG. 1 a rights database 104, representing the database in nonvolatile memory (e.g., semiconductor memory and/or magnetic/optical storage) for tracking the expected number of inactive components (EN-IC) values and the pending expected number of inactive components (PEN-IC) values for three exemplary component types: CPUs, cells, and memory. As the term is employed herein, a cell is subsystem that may include a processor and memory and may serve as a building block for larger systems. Although only three types of components are illustrated in FIG. 1, other software and/or hardware components may also exist, as stated earlier.

As described above, EN-IC values track the acquired right to the components, and PEN-IC values track the pending right to the components. There are however other ways to track the acquired right and the pending right (such as by tracking the expected number of active components and the pending expected number of active components or other variations thereof).

As shown in rights database 104, the EN-IC values for CPUs, cells, and memory are 4, 1, and 2 GB respectively. The PEN-IC values for CPUs, cells, and memory are 3, 0, and 0.5 GB respectively. In this case, since the PEN-IC values are less than the EN-IC values, there is an outstanding pending right granted to 1 CPU (4 minus 3), 1 cell (1 minus zero), and 1.5 GB of memory.

To obtain the pending right, a user 108 of computer system 102 would interact with a portal 110 via a network 112. In the example of FIG. 1, portal 110 represents an internet website that is operated by the vendor of computer system 102. Through portal 110, user 108 may furnish the identification data associated with his company, with computer system 102, and the quantities and types of components desired to be activated (1 CPU, 1 cell, and 1.5 GB of memory in the present example). Codes in portal 110 may then check with audit system 114 to ascertain whether the request is valid. The request may be deemed invalid if, for example, the number of components requested in the pending right request exceeds the number of inactive components available in computer system 102. The request may also be deemed invalid if fraud or abuse is detected. This aspect is discussed later herein.

If the request is deemed valid, portal 110 issues a codeword for use to activate the requested components. The codeword is generally one that can be entered into computer system 102 and understood by computer system 102 as a request to allow the activation of up to a specific number of components. A single codeword may cover multiple components if desired. Preferably, the pending right is granted for a limited amount of time. The codeword may include data that allows computer system 102 to determine the expiration time of the pending right (e.g., a time stamp).

Preferably, the codeword is undecipherable by humans but issued in a format that can be applied using a conventional data entry method (such as ASCII characters). Thus, the codeword may be typed in at computer 102 by the user, selected using a point device by the user, or may be even entered using the cut-and-paste method. After entry, the codeword is stored in a codeword database 116 as shown. Once the codeword is applied to computer system 102, the user may activate the additional components provisionally granted.

It should be pointed out that portal 110 is not the only mechanism through which a request for provisional capacity can be made and a codeword can be issued. The user of computer system 102 (e.g., a system administrator or a user responsible for the configuration of computer system 102) may employ other communication methods (e.g., phone, PDAs, wireless terminals, facsimile) to communicate the request and receive the codeword.

Activation is allowed after the application of the codeword. Upon activation, for example, a control agent 120 of computer system 102 may ascertain the number of inactive components for each component type (e.g., CPU) per the activation request. If the resulting number of inactive CPUs is equal to or larger than the EN-IC value of 4 for CPUs, the activation of the requested number of CPUs is allowed. Assuming, however, that computer system 102 has a total of 8 CPUs and the acquired right is for 4 CPUs (and therefore the EN-IC value for CPUs is 4 or 8 minus 4). If the user has requested to activate 5 CPUs (i.e., 1 more than the number of CPUs allowed under the acquired right), there would be 3 inactive CPUs according to the activation request. In this case, the EN-IC value is greater than the number of inactive CPUs per the activation request. The system is technically in an exception state since there are fewer inactive CPUs per the activation request than there should be according to the acquired right granted.

In this exception state, instead of disallowing the activation request, a further check is made against the PEN-IC value to see if activation is possible due to a grant of pending right. If the resulting number of inactive CPUs per the activation request is greater than or equal to the PEN-IC value for the CPUs, activation is then allowed. Note that if the pending right grant had expired, the PEN-IC value would have been incremented upon expiration by control agent 120, thereby rendering the expired pending right grant of no use in activating the additional requested CPU. In the present example, however, since the PEN-IC value is 3 for the CPUs, activation is allowed. On the other hand, if the number of inactive CPUs per the activation request is less than the PEN-IC value for the CPUs, activation is denied.

Once activated, the components activated under the provisional grant may be employed by the user until the expiration of the provisional grant. As mentioned earlier, the duration of the provisional grant may be included in, or derived from, the codeword. During the time the system operates under a provisional grant and/or upon expiration of the provisional grant, the user is preferably reminded periodically to arrange to convert the pending right to an acquired right, e.g., through the purchase and/or license of additional components.

Upon expiration of the pending right period, any number of corrective actions may be taken. For example, the components activated under an expired pending right grant may be immediately removed from use. More preferably, the user is given reminders in advance of the expiration and/or a grace period upon expiration to allow the user time to arrange to convert the pending right to an acquired right. In one embodiment, the PEN-IC value is incremented, upon expiration of a pending right grant, by a value representative of the number of components covered by the now-expired pending right grant. At the next system reboot, the aforementioned check against the PEN-IC value may result in a refusal to activate components in excess of the number of components granted under the acquired right.

Note that the situation described above is modified somewhat if there are multiple provisional grants. In such case, some provisional grants may expire while others may remain in effect. By using a universal value (such as PEN-IC) to track the pending expected number of inactive component, the result is the same in that the user cannot activate more components than allowed under a combination of acquired right grant and unexpired pending right grant(s).

Note that FIG. 1 employs the EN-IC values and PEN-IC values to track the acquired right grant and the pending right grant(s) respectively. As mentioned, other ways of tracking the number of active (or inactive) components of each component type are possible. Furthermore, although FIG. 1 shows a partitioned computer system of which two cells 130 and 132 are shown, there is no requirement that the computer system be partitioned into partitions, or into cells.

FIG. 1 also shows a per partition number of active processors (140), which is employed to track the number of active processors (under both the acquired right and the pending right) that the user wants to have in a given partition. Since there is only one partition shown in FIG. 1, only one value, 4, is shown. In this case, the user wishes to have 4 processors active in the single partition of computer system 102.

Figure 2:
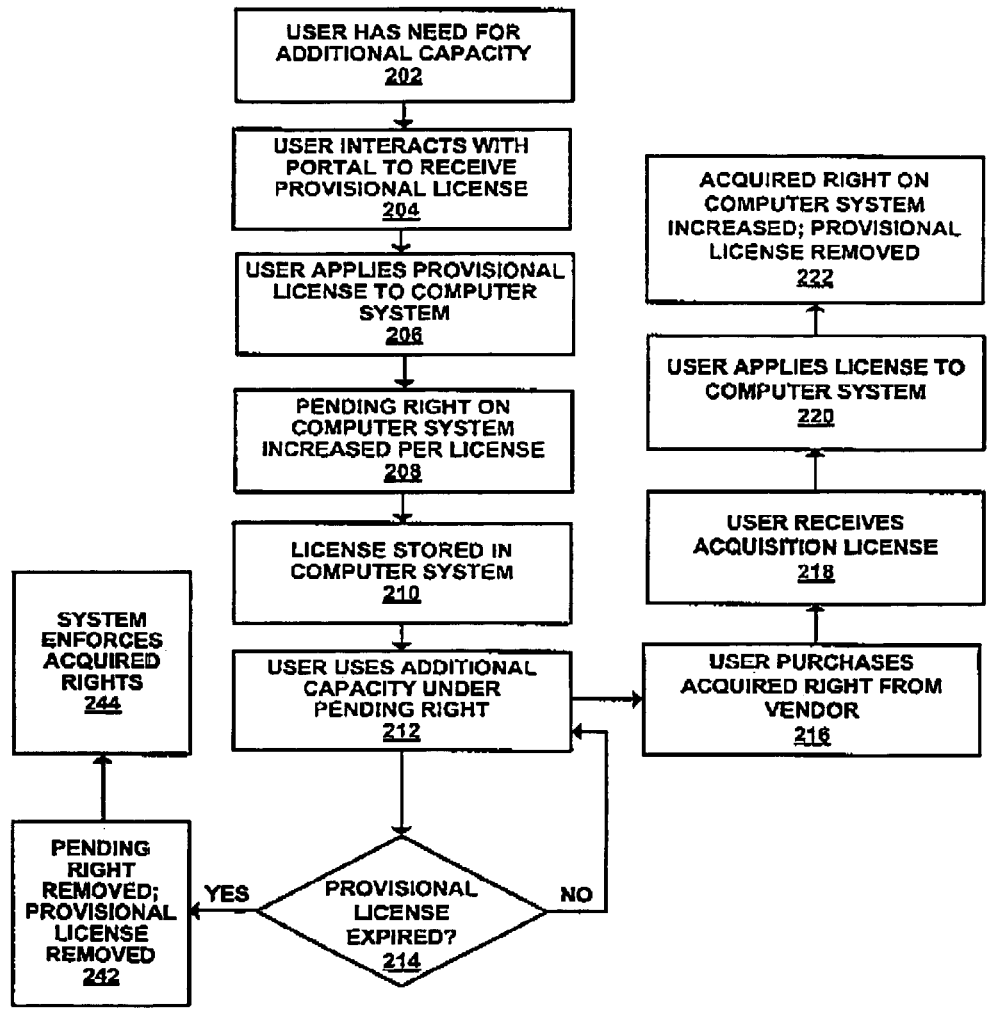
FIG. 2 shows, in accordance with one embodiment of the present invention, a flow chart illustrating the steps for activating inactive components in a computer system.

FIG. 2 shows, in accordance with one embodiment of the present invention, a flow chart illustrating the steps for activating inactive components in a computer system. If the user has a need for additional capacity (202), the user may interact with the portal to receive a provisional license for the pending right to the additional capacity (204). Once the provisional license is received, the user may apply the received provisional license to the computer system (206). The application of the provisional license increases the pending right in accordance with the terms of the provisional license (208). Further, the licensing terms of the provisional license are stored (210) in the computer system in order to, for example, determine the expiration date of the provisional license and to take action upon expiration if the user has not converted the pending right to an acquired right.

In block 212, the user can exercise the provisional or pending right as specified in the provisional license by, for example, activating the additional capacity granted under the provisional license. The expiration date is tracked, and if the user obtains acquired right to the additional capacity (block 216), the user would receive an acquisition license for the additional capacity (218). The acquisition license represents a more permanent arrangement with respect to the additional capacity and may, for example, involve a transfer of cash, cash equivalent, or other goods or services to the vendor in exchange for the right to use the additional capacity for a predetermined period of time or permanently.

The application of the acquisition license to the computer system (220) results in an increase to the acquired right and the removal of the provisional license (222). If the user only purchases acquired right for a portion of the additional capacity utilized pursuant to a provisional license, the acquired right would be increased only by the amount of acquired right purchased and only a portion of the provisional license rights would be removed.

On the other hand, if the provisional license expires before the conversion by the user to an acquired license (as determined in block 214), the provisional license would be removed (242) after an applicable grace period (if any) has passed, and any pending right under the now-removed provisional license would terminate (242 and 244). In one embodiment, the ability to use the additional capacity obtained under the now-expired provisional license would cease immediately. In another embodiment, the user may still be able to continue to use the additional capacity until the next system boot. This latter scenario may be more preferable as it reduces the risk of damage to data.

Figure 3:
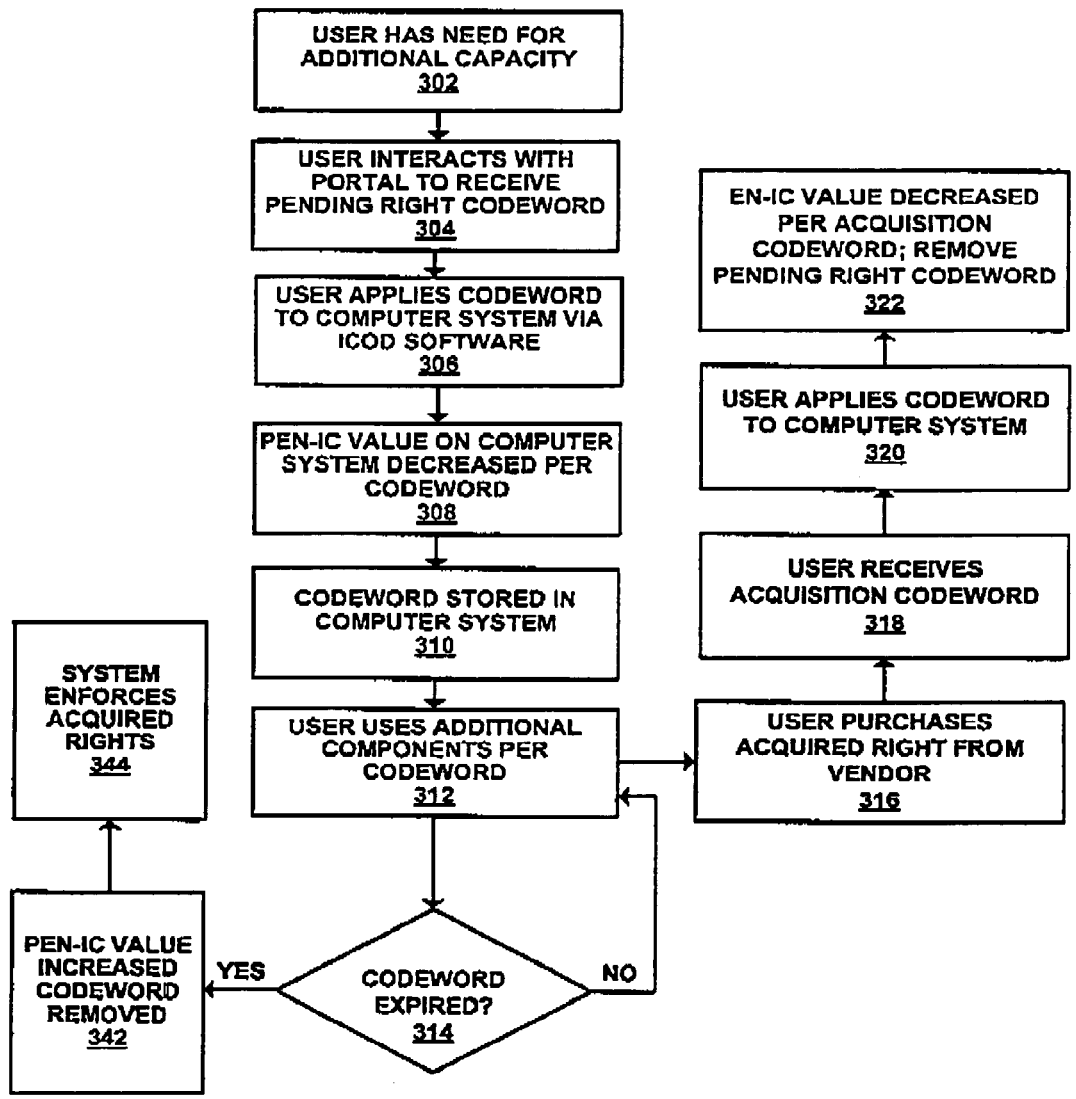
FIG. 3 shows, in accordance with one specific embodiment of the present invention, a flow chart illustrating the steps for activating inactive components in a computer system that offers instant capacity on demand (ICOD) capability.

FIG. 3 shows, in accordance with one specific embodiment of the present invention, a flow chart illustrating the steps for activating inactive components in a computer system that offers instant capacity on demand (ICOD) capability. If the user has a need for additional capacity (302), the user may interact with the portal to receive a provisional license for the pending right to the additional capacity in the form of a pending right codeword for the provisional capacity (304). Generally speaking, the user may be required to enter identification information regarding the customer, the computer system, the amount of additional capacity desired, and the like. This information may be encapsulated in some format into the pending right codeword.

Once the pending right codeword is received, the user may apply the pending right codeword to the computer system (306) using the ICOD software. The application of the pending right codeword increases the pending right in accordance with the terms of the provisional license (308). In the example of FIG. 3, the increase in pending right is accomplished by decrementing the PEN-IC value (308) responsive to data encoded in the pending right codeword. Further, the pending right codeword is stored (310) in the computer system in order to, for example, determine the expiration date of the provisional license and to take action upon expiration if the user has not converted the pending right to an acquired right.

In block 312, the user can exercise the provisional or pending right as specified in the provisional license by, for example, activating the additional components granted under the provisional license. The expiration date is tracked, and if the user makes a purchase of acquired right to the additional components (block 316), the user would receive an acquisition license for the additional capacity (318), including an acquisition activation codeword. As mentioned earlier, the acquisition license represents a more permanent arrangement with respect to the additional capacity and may, for example, involve a transfer of cash, cash equivalent, or other goods or services to the vendor in exchange for the right to use the additional capacity for a predetermined period of time or permanently.

The application of the acquisition codeword to the computer system (320) results in an increase to the acquired right and the removal of the pending right codeword (322). In the example of FIG. 3, the acquired right is increased by decreasing the EN-IC value.

If the pending right codeword expires before the conversion by the user to an acquired right (as determined in block 314), the pending right codeword would be removed (342) after an applicable grace period (if any) has passed, and the PEN-IC value would be incremented to reflect the termination of any pending right granted under the now-removed pending right codeword. As mentioned, the ability to use the additional capacity obtained under the now-expired provisional license can terminate immediately, or the user may still be allowed to continue to use the additional capacity until the next system boot to minimize possible risk to data (344).

Figure 4:
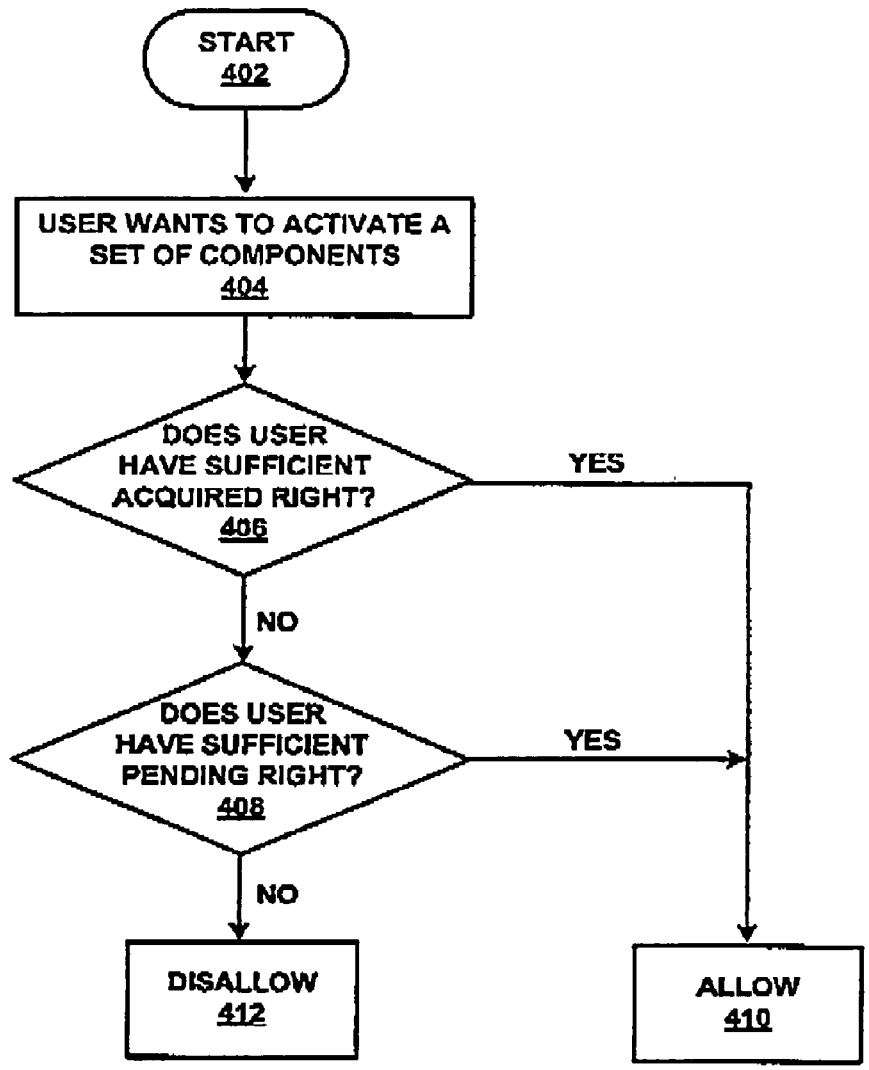
FIG. 4 shows, in accordance with one embodiment, the steps taken by the system upon an attempted activation of components by the user.

FIG. 4 shows, in accordance with one embodiment, the steps taken by the system upon an attempted activation of components by the user. The attempted activation begins at block 402. In block 404, the user indicates to the computer system a desire to activate a certain number of components. The system ascertains (406) whether there is sufficient acquired right to cover the number of components requested. In one embodiment, the test in block 406 involves comparing the EN-IC value with the number of inactive components that would result from the request. If there is sufficient acquired right (e.g., if the number of inactive components resulted from the request is equal to or is greater than the EN-IC value), the activation is allowed (410).

On the other hand, if there is insufficient acquired right (e.g., if the number of inactive components resulted from the request is less than the EN-IC value), a further check is made against the pending right granted (408). If there is sufficient pending right to cover the number of components that are not covered by the acquired right (e.g., if the number of inactive components resulted from the request is equal to or is greater than the PEN-IC value), activation is allowed, at least until the expiration of the pending right duration. On the other hand, if there is insufficient pending right to cover the number of components that are not covered by the acquired right (e.g., if the number of inactive components resulted from the request is less than the PEN-IC value), activation is not allowed (412).

As can be appreciated from the foregoing, the invention provides arrangements and techniques for rapidly activating inactive components in a computer system. The fact that the inactive components can be activated provisionally almost instantly offers tremendous advantages to users. Since the provisional license (such as the codeword) can be applied for at any time and granted automatically (if qualified), the provisional capacity can be obtained any time, even at night or on weekends when the human vendor may be unavailable.

Further, the additional capacity is provided in a manner that requires little work on the part of the vendor. In the embodiment that involves the issuance of a pending right codeword from the vendor's portal, almost no work is required of the vendor to allow the user to provisionally activate inactive components to obtain the additional capacity on a provisional basis. Upon expiration of the provisional license, the provisional capacity is automatically removed without further involvement by the vendor. Of course the vendor can always follow up with sales calls if desired but this arrangement still represents a significant labor saving for vendors.

Further, the invention allows the inactive components to be rapidly activated without requiring the computer system to be exposed to the potential risks associated with having an email or internet connectivity facility. Additionally, since the inactive components can be activated only by obtaining a provisional license (such as a pending right codeword) from the vendor, accountability is assured. The vendor is made aware of the intent to activate previously inactive components, the identity of the requesting user and/or the computer system involved, and the number of components requested. The vendor can then track the provisional grants for potential sales opportunities and/or potential abuses.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of activating a previously inactive component in a computer system comprising:
receiving a request for activating said previously inactive component;
ascertaining whether there exists a first right for activating said previously inactive component;
if said first right exists, activating said previously inactive component in accordance with said first right;
if there is no first right for activating said previously inactive component, ascertaining whether there exists a second right for activating said previously inactive component, said second right being more restricted than said first right; and
if said second right exists, activating said previously inactive component in accordance with said second right,
wherein said first right represents an acquired right and said second right represents a pending right granted based on a provisional license that is shorter in duration than a duration of said first right,
wherein said first right is represented by an expected inactive component variable, said expected inactive component variable representing the number of inactive components having the same type as said inactive component that should be present in said computer system to be in compliance with said first right, said second right is represented by a pending expected inactive component variable, said expected inactive component variable representing the number of inactive components having the same type as said inactive component that should be present in said computer system to be in compliance with both said first right and said second right,
wherein said pending expected inactive component variable is decremented by an application of a codeword, said second right being deemed to exist if a value of said pending expected inactive component variable is smaller than a value of said expected inactive component variable in said computer system, said pending expected inactive component variable and said expected inactive component variable pertaining to the same component type in said computer system,
wherein said value of said pending expected inactive component variable is incremented when said second right expires.

2. The method of claim 1 wherein said codeword is obtained from one of a seller, a servicing entity, and a manufacturer of said computer system through a telecommunication network.

3. The method of claim 2 wherein said telecommunication network is an Internet network.

4. The method of claim 1 wherein said codeword is obtained from one of a seller, a servicing entity, and a manufacturer of said computer system through an Internet website associated with said one of said seller, said servicing entity, and said manufacturer of said computer system.

5. The method of claim 1 wherein said second right expires upon expiration of said provisional license.

6. The method of claim 1 wherein said first right is deemed to exist if a value of said expected inactive component variable is smaller than a number of inactive components that would exist in said computer system if said request is granted.

7. The method of claim 6 wherein said value of said expected number of inactive component variable is decremented by a given value if a user of said computer system obtains acquired right to additional components other than components covered by said first right, said given value representing a number of said additional components.

8. The method of claim 1 wherein said previously inactive component is a CPU.

9. The method of claim 1 wherein said previously inactive component is a quantity of memory.

10. The method of claim 1 wherein said previously inactive component is an I/O device.

11. The method of claim 1 wherein said computer system is a partitioned computer system.

12. The method of claim 1 wherein said previously inactive component is one of computer software and computer software capability.

13. The method of claim 1 wherein said previously inactive component is a subset of said computer system.

14. A method for allowing a user to activate a previously inactive component in a computer system, said computer including components already activated under an acquired right, comprising:
   sending a request for activating said previously inactive component to a vendor of said computer system;
   ascertaining, upon receiving said request, whether said activating said previously inactive components causes a number of permissible provisionally activable components to be exhausted;
   if said activating said previously inactive components causes said number of permissible provisionally activable components to be exhausted, refusing said request;
   if said activating said previously inactive components does not cause said number of permissible provisionally activable components to be exhausted, generating a codeword for transmitting to said user;
   obtaining said codeword from said vendor, said codeword implementing a pending right to activate said previously inactive component and including an authorization of said activating said previously inactive component and a time parameter if said activating said previously inactive components does not cause said number of permissible provisionally activable components to be exhausted; and entering said codeword into said computer system, thereby allowing said additional component to be activated in said computer system during a time period allowed under said pending right, said time period being derivable from said time parameter.

15. The method of claim 14 wherein said codeword is in an ASCII format.

16. The method of claim 14 wherein said codeword is obtained from an Internet portal.

17. The method of claim 14 wherein said codeword is entered into said computer system using methods other than an email received at said computer system.

18. The method of claim 14 wherein said codeword is manually entered using a keyboard at said computer system.

19. The method of claim 14 wherein said activation of said previously inactive component is permissible during said time period allowed under said pending right, said activation of said previously inactive component is not permitted after said time period expires.

20. The method of claim 14 wherein said activation of said previously inactive component is permissible during said time period allowed under said pending right, said activation of said previously inactive component is not permitted after an expiration of said time period and of a grace period.

21. The method of claim 14 wherein said previously inactive component is a CPU.

22. The method of claim 14 wherein said previously inactive component is a quantity of memory.

23. The method of claim 14 wherein said previously inactive component is an I/O device.

24. The method of claim 14 wherein said computer system is a partitioned computer system.

25. The method of claim 14 wherein said previously inactive component is a subset of said computer system.

26. The method of claim 14 wherein said previously inactive component is one of computer software and computer software capability.

* * * * *

UNITED STATES PATENT AND TRADEMARK OFFICE
CERTIFICATE OF CORRECTION

PATENT NO. : 7,373,497 B2
APPLICATION NO. : 10/351128
DATED : May 13, 2008
INVENTOR(S) : Edgar I. Circenis et al.

It is certified that error appears in the above-identified patent and that said Letters Patent is hereby corrected as shown below:

In column 14, line 1, in Claim 14, delete "of" and insert -- for --, therefor.

Signed and Sealed this

Fifth Day of August, 2008

JON W. DUDAS
*Director of the United States Patent and Trademark Office*